(12) United States Patent
Mehra

(10) Patent No.: US 10,341,803 B1
(45) Date of Patent: *Jul. 2, 2019

(54) HEAD-RELATED TRANSFER FUNCTION (HRTF) PERSONALIZATION BASED ON CAPTURED IMAGES OF USER

(71) Applicant: Facebook Technologies, LLC, Menlo Park, CA (US)

(72) Inventor: Ravish Mehra, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/022,051

(22) Filed: Jun. 28, 2018

Related U.S. Application Data

(63) Continuation of application No. 15/702,603, filed on Sep. 12, 2017, now Pat. No. 10,038,966.

(60) Provisional application No. 62/410,815, filed on Oct. 20, 2016.

(51) Int. Cl.
*H04S 7/00* (2006.01)
*G06K 9/00* (2006.01)
*H04R 5/033* (2006.01)

(52) U.S. Cl.
CPC .......... *H04S 7/304* (2013.01); *G06K 9/00268* (2013.01); *G06K 9/00362* (2013.01); *H04R 5/033* (2013.01); *H04S 2400/11* (2013.01); *H04S 2420/01* (2013.01)

(58) Field of Classification Search
CPC ..... H04R 5/033; H04S 2420/01; H04S 7/303; H04S 2400/11; H04S 7/304; G06K 9/00268; G06K 9/00362
USPC ......................................................... 381/303
See application file for complete search history.

(56) References Cited

U.S. PATENT DOCUMENTS

2012/0183161 A1* 7/2012 Agevik .................. H04S 7/302
381/303

* cited by examiner

*Primary Examiner* — Paul Kim
(74) *Attorney, Agent, or Firm* — Fenwick & West LLP

(57) ABSTRACT

A virtual reality (VR) system simulates sounds that a user of the VR system perceives to have originated from sources at desired virtual locations of the VR system. The simulated sounds are generated based on personalized head-related transfer functions (HRTF) of the user that are constructed by applying machine-learned models to a set of anatomical features identified for the user. The set of anatomical features may be identified from images of the user captured by a camera. In one instance, the HRTF is represented as a reduced set of parameters that allow the machine-learned models to capture the variability in HRTF across individual users while being trained in a computationally-efficient manner.

20 Claims, 5 Drawing Sheets

*Training Data*

| Individual No. | Head Diameter (cm) | Shoulder Width (cm) | Height (cm) | Pinnae Size (cm) | $C_{00,L}$ (magnitude) | $C_{10,L}$ (magnitude) | ITR (sec) |
|---|---|---|---|---|---|---|---|
| 1 | 24 | 60 | F | 1.5 | 0.7 | 0.2 | 0.005 |
| 2 | 23 | 69 | F | 2.5 | 0.3 | 0.4 | 0.003 |
| 3 | 25 | 55 | M | 1.8 | 0.4 | 0.1 | 0.004 |
| 4 | 29 | 54 | M | 2.4 | 0.8 | 0.15 | 0.006 |
| 5 | 27 | 65 | M | 2.3 | 0.4 | 0.05 | 0.001 |

HEAD-RELATED TRANSFER FUNCTION (HRTF) PERSONALIZATION BASED ON CAPTURED IMAGES OF USER

CROSS-REFERENCE TO RELATED APPLICATIONS

This application is a continuation of co-pending U.S. application Ser. No. 15/702,603, filed Sep. 12, 2017, which claims the benefit under 35 U.S.C. § 119(e) of U.S. Provisional Application No. 62/410,815, filed on Oct. 20, 2016, which is incorporated by reference herein in its entirety.

BACKGROUND

The present disclosure generally relates to the field of stereophony, and specifically to acquiring personalized head-related transfer functions (HRTF) for users of virtual reality systems.

Humans can determine locations of sounds by comparing sounds perceived at each ear. Specifically, the brain determines the location of a sound source by utilizing subtle intensity, spectral, and timing differences of the sound perceived in each ear. For example, sound sources located closer to the left ear may be signaled by a subtle, but faster arrival time of sound in the left ear and a relatively high amplitude of high-frequency sounds perceived in the left ear compared to that in the right ear.

The intensity, spectra, and arrival time of the sound at each ear is characterized by a HRTF unique to each user based on various anatomical features of the user. Specifically, the HRTF indicates the changes between the source sound signal to that of the sound signal received at each ear. Thus, perceived sounds from sound sources located at various locations relative to the user can be simulated if the unique HRTF for the user is known.

In virtual reality systems, it is advantageous to generate an accurate virtual acoustic environment for users that reproduce sounds for sources at different virtual locations from the user to create an immersive virtual reality environment. However, conventional approaches for determining individual HRTF are inefficient and typically require significant amounts of hardware resources and time. Alternatively, the accuracy of the virtual acoustic environment is diminished if a common HRTF is used across multiple users.

SUMMARY

A virtual reality (VR) system simulates sounds that a user of the VR system perceives to have originated from sources at desired virtual locations of the virtual environment. The simulated sounds are generated based on a personalized HRTF of the user that are constructed from a set of anatomical features identified for the user. In one embodiment, the VR system identifies the set of anatomical features from images of the user generated using a camera. The identified features may include, for example, head diameter, shoulder width, shape and size of the pinnae, and the like.

In one or more embodiments, the personalized HRTF is constructed by applying one or more machine-learned models to the set of anatomical features. In one embodiment, perceptual models generate low-dimensional representations of the HRTF with a reduced set of parameters. The personalized HRTF can then be reconstructed from the low-dimensional representations.

BRIEF DESCRIPTION OF THE DRAWINGS

FIG. 4 illustrates an example structure of training data generated by the data generation module, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A virtual reality (VR) system simulates sounds that a user of the VR system perceives to have originated from sources at desired virtual locations of the virtual environment. The simulated sounds are generated based on a personalized HRTF of the user that are constructed by applying machine-learned models to a set of anatomical features identified for the user. The set of anatomical features may be identified from images of the user captured by a camera. In one instance, the HRTF is represented as a reduced set of parameters that allow the machine-learned models to capture the variability in HRTF across individual users while being trained in a computationally-efficient manner.

Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
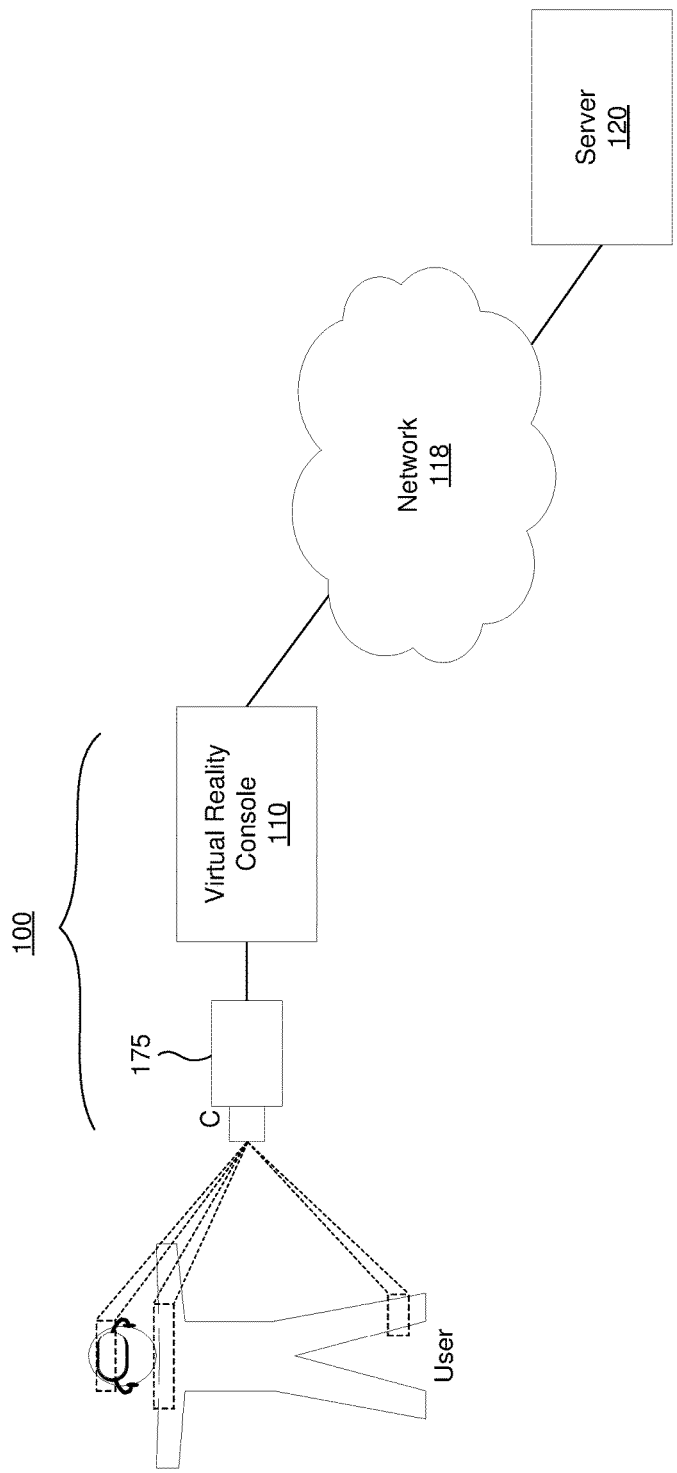
FIG. 1 is a block diagram of a system environment for generating a personalized HRTF, in accordance with an embodiment.

FIG. 1 is a block diagram of a system environment for generating personalized HRTF, in accordance with an embodiment. The environment includes a virtual reality (VR) system 100 connected by a network 118 to a server 120. In the embodiment of FIG. 1, only one VR system 100 and server 120 are illustrated but there may be multiple instances of each of these components. For example, there may be thousands or millions of VR systems 100 in communication with one or more servers 120.

The system environment shown in FIG. 1 allows a virtual reality (VR) system 100 to simulate sounds perceived by a user of the VR system 100 as having originated from sources at desired virtual locations of the virtual environment. The simulated sounds are generated based on a personalized HRTF of the user constructed based on a set of anatomical features identified for the user. Specifically, the HRTF for a user parameterizes the intensity, spectra, and arrival time of sounds that originate from various locations relative to the user when they are perceived by the user.

The network 118 provides a communication infrastructure between the VR systems 100 and the servers 120. The network 118 is typically the Internet, but may be any network, including but not limited to a Local Area Network (LAN), a Metropolitan Area Network (MAN), a Wide Area Network (WAN), a mobile wired or wireless network, a private network, or a virtual private network.

The VR system 100 is a computer-driven system that immerses the user of the system 100 in a virtual environment through simulating senses, such as vision, hearing, touch, or smell, of the user in the virtual environment. The user of the VR system 100 can explore or interact with the virtual environment through hardware and software tools embedded in the VR system 100. For example, the VR system 100 may simulate an imaginary 3D environment for a game, and the user of the VR system 100 may play the game by exploring and interacting with objects in the imaginary environment.

The VR system 100 presents various forms of media, such as images, videos, audio, or some combination thereof to simulate the virtual environment to the user. To generate an immersive experience both visually and auditory, the VR system 100 simulates sounds perceived by the user of the VR system 100 as originating from sources at desired virtual locations of the virtual environment. The virtual location of a sound source represents the location of the source relative to the user if the user were actually within the virtual environment presented by the VR system 100. For example, given the virtual location of a user's character, the VR system 100 may simulate sounds from other characters located at left and back sides of the user's character. As another example, the VR system 100 may simulate sounds from virtual locations above and below the user's character.

The VR system 100 simulates the sounds based on personalized HRTF of the user. The personalized HRTF is constructed from a set of anatomical features identified for the user. The HRTF of a user characterizes the intensity, spectra, and arrival time of the source sound at each ear, and is dependent on the location of the sound source relative to the user. In addition, as sounds are reflected and diffracted off the body of the user before being processed by the ears, the HRTF is unique based on the various anatomical features of the user. The anatomical features may include height, head diameter, size and shape of the ear pinnae, and the like. Thus, sounds can be accurately simulated to give the sensation to the user that the sounds originating from various locations if the HRTF for the user is used.

Specifically, given a source with signal X(f) in the frequency domain, the perceived sound in the left (right) ear of a user in the frequency domain f is given by:

$$Y_{L,R}(f,\theta,\varphi,d) = c_1 \cdot HRTF_{L,R}(f,\theta,\varphi,d) \cdot X(f) \qquad (1)$$

where $HRTF_L(f,\theta,\varphi,d)$ is the HRTF for the left ear of the user, $HRTF_R(f,\theta,\varphi,d)$ is the HRTF for the right ear of the user, and $c_1$ is any other factor that is omitted or not shown in equation (1). The variables $(\theta,\varphi,d)$ denote spherical coordinates that represent the relative position of the sound source in the three-dimensional space surrounding the user. That is, d denotes the distance of the sound source, $\varphi$ denotes the horizontal or azimuth angle of the sound source, and $\theta$ denotes the vertical or ordinal angle of the sound source from the user.

In one embodiment, the VR system 100 captures one or more images of the users using a camera 175. The VR system 100 identifies a set of anatomical features from the images of the users. The VR system 100 provides the identified features to a server 120, and in response, receives a personalized HRTF for the user generated from the identified features. The VR system 100 then simulates sounds based on the personalized HRTF such that each user can experience an immersive VR environment. A more detailed embodiment of the VR system 100 is described in detail below in conjunction with FIG. 2.

The server 120 is a computing device that receives anatomical features identified for users of the VR system 100, and generates personalized HRTF for the users based on the received anatomical features. In one embodiment, the server 120 generates the personalized HRTF by applying one or more machine-learned models to the anatomical features, as described below in detail with reference to FIG. 3. The machine-learned models are trained from a database containing information on anatomical features for test subjects and their corresponding HRTF. The server 120 may be managed by the business entity that produces the VR systems 100, or may be managed by a separate entity from the business entity. A more detailed embodiment of the server 120 is described in detail below in conjunction with FIG. 3.

Virtual Reality System

Figure 2:
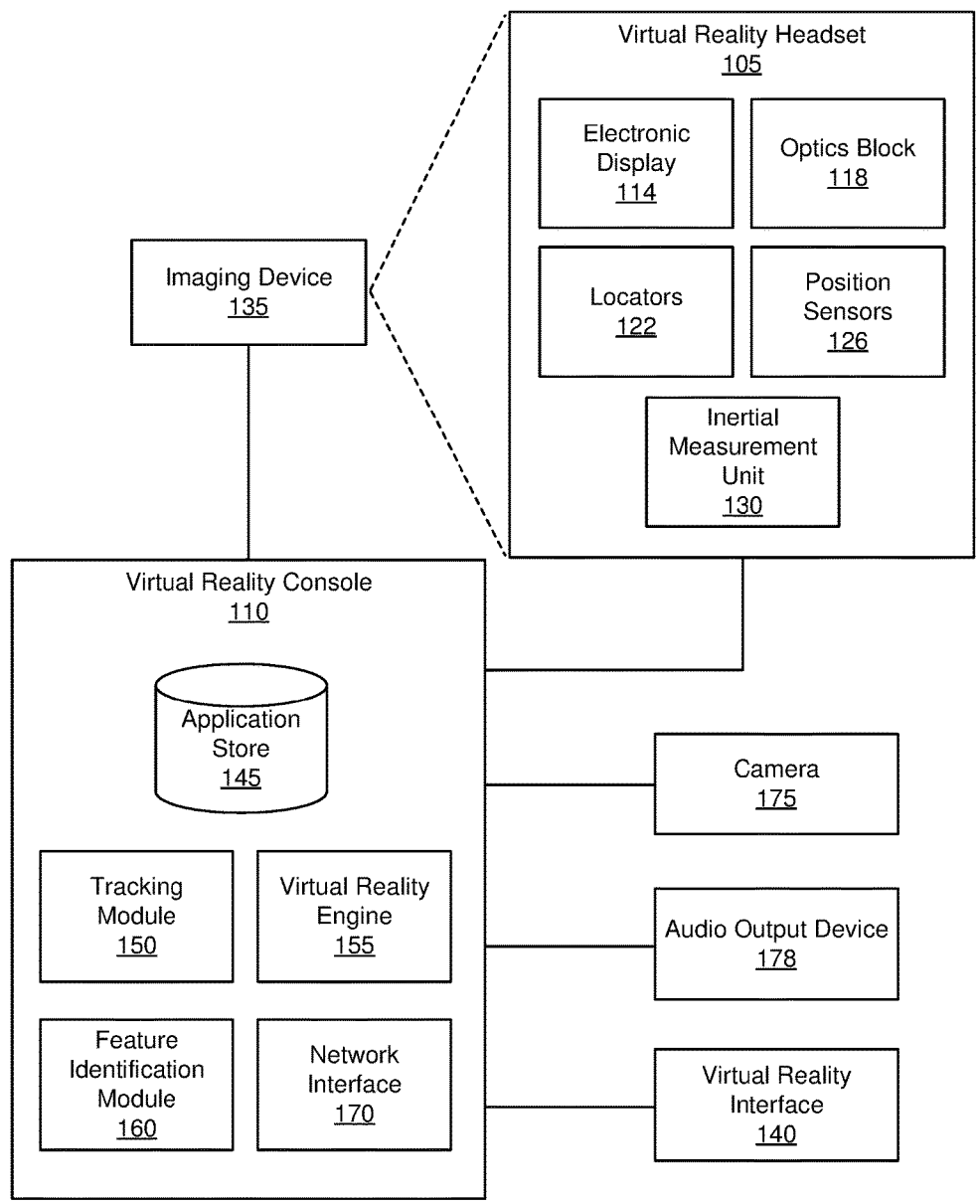
FIG. 2 is a block diagram of the virtual reality system, in accordance with an embodiment.

FIG. 2 is a block diagram of a VR system environment 100 in which a VR console 110 operates. The system environment 100 shown by FIG. 1 comprises a VR headset 105, an imaging device 135, a camera 175, an audio output device 178, and a VR input interface 140 that are each coupled to the VR console 110. While FIG. 2 shows an example system 100 including one VR headset 105, one imaging device 135, one camera 175, one audio output device 178, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110.

Some embodiments of the VR system 100 have different and/or additional modules than the ones described in the embodiment of FIG. 2. Similarly, the functions can be distributed among the modules in a different manner than is described in the embodiment of FIG. 2. Certain modules and functions can be incorporated into other modules of the VR system 100 or the server 120.

In alternative configurations, different and/or additional components may be included in the system environment 100.

The VR headset 105 is a head-mounted display (HMD) that presents media to a user. Examples of media presented by the VR head set include one or more images, video, or some combination thereof. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 114, an optics block 118, one or more locators 122, one or more position sensors 126, and an inertial measurement unit (IMU) 130.

The electronic display 114 displays images to the user in accordance with data received from the VR console 110.

The optics block 118 magnifies received light, corrects optical errors associated with the image light, and presents the corrected image light to a user of the VR headset 105. In various embodiments, the optics block 118 includes one or more optical elements. Example optical elements included in the optics block 118 include: an aperture, a Fresnel lens, a convex lens, a concave lens, a filter, or any other suitable optical element that affects image light. Moreover, the optics block 118 may include combinations of different optical elements. In some embodiments, one or more of the optical elements in the optics block 118 may have one or more coatings, such as anti-reflective coatings.

The locators 122 are objects located in specific positions on the VR headset 105 relative to one another and relative to a specific reference point on the VR headset 105. A locator 122 may be a light emitting diode (LED), a corner cube reflector, a reflective marker, a type of light source that contrasts with an environment in which the VR headset 105 operates, or some combination thereof. In embodiments where the locators 122 are active (i.e., an LED or other type of light emitting device), the locators 122 may emit light in the visible band (~380 nm to 750 nm), in the infrared (IR) band (~750 nm to 1 mm), in the ultraviolet band (10 nm to 380 nm), in some other portion of the electromagnetic spectrum, or in some combination thereof.

The IMU 130 is an electronic device that generates fast calibration data indicating an estimated position of the VR headset 105 relative to an initial position of the VR headset 105 based on measurement signals received from one or more of the position sensors 126. A position sensor 126 generates one or more measurement signals in response to motion of the VR headset 105. Examples of position sensors 126 include: one or more accelerometers, one or more gyroscopes, one or more magnetometers, another suitable type of sensor that detects motion, a type of sensor used for error correction of the IMU 130, or some combination thereof. The position sensors 126 may be located external to the IMU 130, internal to the IMU 130, or some combination thereof.

The imaging device 135 generates slow calibration data in accordance with calibration parameters received from the VR console 110. Slow calibration data includes one or more images showing observed positions of the locators 122 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., for increasing signal to noise ratio). The imaging device 135 is configured to detect light emitted or reflected from locators 122 in a field of view of the imaging device 135. In embodiments where the locators 122 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or to end an application or to perform a particular action within the application. The VR input interface 140 may include one or more input devices. Example input devices include a keyboard, a mouse, a game controller, a joystick, a yoke, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The camera 175 captures one or more images of the user. The images may be two-dimensional or three-dimensional. For example, the camera 175 may capture 3D images or scans of the user as the user rotates his or her body in front of the camera 175. Specifically, the camera 175 represents the user's body as a plurality of pixels in the images. In one particular embodiment referred to throughout the remainder of the specification, the camera 175 is a RGB-camera, a depth camera, an infrared (IR) camera, a 3D scanner, or a combination of the like. In such an embodiment, the pixels of the image are captured through a plurality of depth and RGB signals corresponding to various locations of the user's body. It is appreciated, however, that in other embodiments the camera 175 alternatively and/or additionally includes other cameras that generate an image of the user's body. For example, the camera 175 may include laser-based depth sensing cameras. The camera 175 provides the images to the image processing module 165 of the VR console 110.

The audio output device 178 is a hardware device used to generate sounds, such as music or speech, based on an input of electronic audio signals. Specifically, the audio output device 178 transforms digital or analog audio signals into sounds that are output to users of the VR system 100. The audio output device 178 may be attached to the headset 105, or may be located separate from the headset 105. In one particular embodiment referred throughout the specification, the audio output device 178 is a headphone or earphone that includes left and right output channels for each ear, and is attached to the headset 105. However, in other embodiments the audio output device 178 alternatively and/or additionally includes other audio output devices that are separate from the headset 105 but can be connected to the headset 105 to receive audio signals. For example, these may include earphones and headphones that can be connected to the headset 105 through auxiliary lines, or loudspeakers, surround sounds systems, and the like.

The VR console 110 provides content to the VR headset 105 or the audio output device 178 for presentation to the user in accordance with information received from one or more of the imaging device 135 and the VR input interface 140. In the example shown in FIG. 2, the VR console 110 includes an application store 145, a tracking module 150, a VR engine 155, a feature identification module 160, and a network interface 170. Some embodiments of the VR console 110 have different components than those described in conjunction with FIG. 2. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the VR headset 105 or the VR interface device 140. Examples of applications include gaming applications, conferencing applications, video playback application, or other suitable applications.

The tracking module 150 calibrates the system environment 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The network interface 170 enables the VR system 100 to communicate with other computing devices, such as the server 120, by the network 118. An embodiment of the network interface 170 supports multiple different wired or wireless networking technologies. For example, the network interface 170 may support networking via Ethernet protocol, mobile telephone protocols (e.g., Long-Term Evolution (LTE), 3G, and Global System for Mobile Communications (GSM)), WiFi communications or BLUETOOTH communications.

The feature identification module 160 receives images of the user captured by the camera 175 and identifies a set of anatomical features from the images that describe physical characteristics of the users relevant to the users' HTRF. The set of anatomical features may contain, for example, the head diameter, shoulder width, height, shape and size of the pinnae, and the like for each user. The anatomical features may be identified through any image processing or analysis algorithm. The set of anatomical features are provided to the server 120 via the network interface 170.

In an alternative embodiment, the feature identification module 160 may be located at the server 120, instead of the VR console 110. In such an embodiment, the images of the user captured by the camera 175 may be provided to the server 120 such that the feature identification module 160 can identify the set of anatomical features from the received images. In yet another alternative embodiment, the feature identification module 160 may even be omitted, and anatomical parameters may be manually provided to the server 120 by, for example, the user of the VR system 100.

The VR engine 155 executes applications within the system environment 100 and receives position information, acceleration information, velocity information, predicted future positions, or some combination thereof, of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

In one embodiment, the VR engine 155 receives a personalized HRTF from the server 120, and generates audio content to provide to users of the VR system 100 through the audio output device 178. The audio content generated by the VR engine 155 is a series of electronic audio signals that are transformed into sound when provided to the audio output device 178. The resulting sound generated from the audio signals is simulated such that the user perceives sounds to have originated from desired virtual locations in the virtual environment. Specifically, the signals for a given sound source at a desired virtual location relative to a user is transformed based on the personalized HRTF for the user and provided to the audio output device 178, such that the user can have a more immersive VR experience.

In one embodiment, the VR engine 155 determines the audio signals in the frequency domain f as:

$$Y_{u(L,R)}(f,\theta_s,\phi_s,d_s) = c_1 \cdot \text{HRTF}_{u(L,R)}(f,\theta_s,\phi_s,d_s) \cdot X_s(f) \quad (2)$$

where $\text{HRTF}_{u(L,R)}(f,\theta_s,\phi_s,d)$ is the personalized HRTF for the left ear of user u, $\text{HRTF}_{u(R)}(f,\theta,\phi,d)$ is the personalized HRTF for the right ear of user u, $(\theta_s,\phi_s,d_s)$ are the three-dimensional spherical coordinates of a sound source s relative to the user u, $X_s(f)$ is the audio signal of the sound source s in the frequency domain, and $c_1$ is any other factor that is omitted or not shown in equation (2) that is used to transform the sound source signal. The VR engine 155 may then provide a time-domain transform of $Y_{u(L,R)}(f,\theta_s,\phi_s,d_s)$ to the audio output device 178 for presentation to the user.

In one embodiment, the VR engine 155 further adjusts the transformation based on the personalized HRTF depending on the physical location of the audio output device 178 relative to the user. For example, if the audio output device 178 is a pair of loudspeakers physically spaced apart from the ears of the user, $(\theta_s,\phi_s,d_s)$ may be further adjusted in equation (2) to account for the additional distance between the loudspeakers and the user.

Example Server for Generating Personalized HRTF

Figure 3:
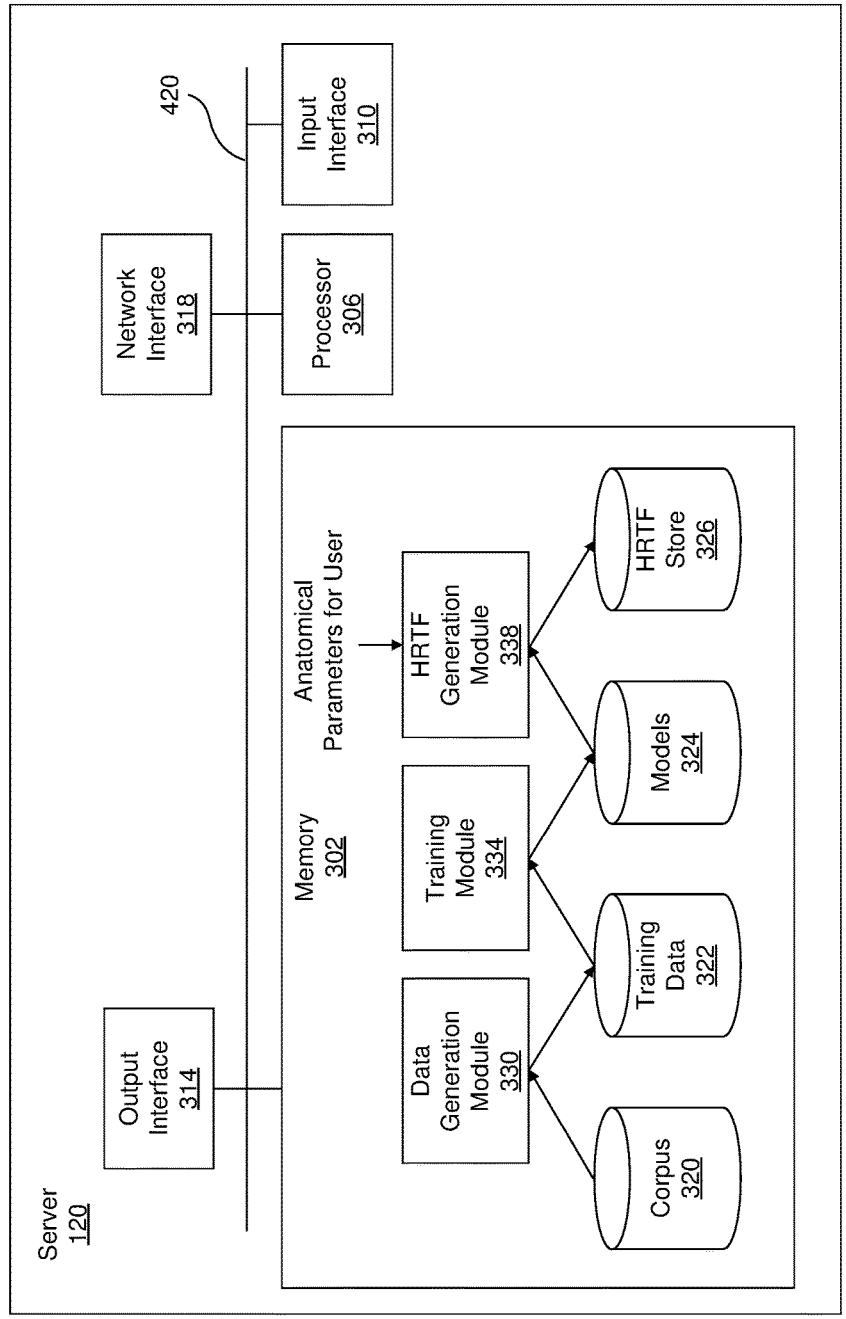
FIG. 3 is a block diagram of the server, in accordance with an embodiment.

FIG. 3 is a detailed block diagram of the server 120, in accordance with an embodiment. The server 120 is a computing device and includes a processor 306, an input interface 310, an output interface 314, a network interface 318, and memory 302. Some embodiments of the server 120 have different and/or additional modules than the ones described here. Similarly, the functions can be distributed among the modules in a different manner than is described here. Certain modules and functions can be incorporated into other modules of the server 120 and/or other entities on the VR system 100.

The memory 302 stores software components including, for example, operating systems and modules for instantiating and executing modules as described herein. The memory 302 includes a data generation module 330, a training module 334, and a HRTF generation module 338. The memory 302 also includes a corpus 320, training data 322, models 324, and a HRTF store 326.

The processor 306 retrieves and executes commands stored in memory 302. The input interface 310 receives data from external sources, such as data on anatomical parameters of users. The output interface 314 is a component for providing the result of computation in various forms, such as the personalized HRTF for the users. The network interface 318 enables the server 120 to communicate with other computing devices by a network.

The corpus 320 contains a database of HRTF measurements for one or more test subjects. In one embodiment, the HRTF measurements are collected by placing test subjects in an anechoic chamber and measuring the HRTF for each test subject. In another embodiment, the HRTF measurements are collected using dummy persons and microphones placed near the ears of each dummy person. In yet another embodiment, the HRTF measurements are generated through computational simulations that simulate the HRTF for test subjects with certain characteristics. In addition to the HRTF, the corpus 320 may contain information on physical characteristics of the test subjects in the form of images, explicit physical measurements, and the like.

The data generation module 330 generates training data 322 for generating machine-learned models 324 of HRTFs. The training data 322 includes, among other information, test subjects' physical characteristics and low-dimensional representations of the test subjects' HRTF.

The set of anatomical features included in the training data 322 are physical characteristics of the test subjects that are identified to be potentially correlated with the HRTF of the test subjects. The set of identified anatomical features for each test subject may contain head diameter, shoulder width, height, shape and size of the pinnae, and the like. The data generation module 330 may identify the anatomical features from images of the test subjects contained in the corpus 320, or infer the anatomical features from other physical measurements of the test subjects contained in the corpus 320. The images of the test subjects may include 2D or 3D images, 3D scans generated by methods such as time-of-flight scanners, triangulation based scanners, structured light scanners, volumetric scanners and the like.

The low-dimensional representations of the HRTF included in the training data 322 represent a fewer set of parameters that compresses a larger set of parameters of the user's full HRTF by taking advantage of properties of the human auditory perception. In one embodiment, the data generation module 330 approximates the magnitude transform of the HRTF as a set of spherical harmonic coefficients, and the phase transform of the HRTF as an interaural time difference (ITD) value that indicates the difference in arrival time between the left and right ears. Specifically, the magnitude transform of the HRTF across the three-dimensional space $(\theta,\varphi,d)$ is modeled as a superposition of spherical harmonic basis functions $Y_{n,m}$, n=0, 1, 2, ..., P, m=0, ±1, ±2, ..., ±n weighted by corresponding spherical harmonic coefficients $C_{n,m}$, n=0, 1, 2, ..., P, m=0, ±1, ±2, ..., ±n where the mode m and the order n in combination define each basis function $Y_{n,m}$, and indicate how each function varies across the 3D space. When the coefficients $C_{n,m}$ are determined, the magnitude transform of the original HRTF can be represented as $$HRTF(f, \theta, \phi, d) = \sum_{n=0}^{P} \sum_{m=-n}^{n} Y_{nm}(\phi, \theta) \cdot C_{nm} + \epsilon \quad (2)$$

where $\epsilon$ is an error term indicating the difference between the low-dimensional representation of the HRTF magnitude transformation and the original HRTF magnitude transformation. Thus, the HRTF can be compressed into a reduced set of spherical harmonic coefficients and an ITD value, and a full HRTF can be reconstructed given the values of these parameters.

In another embodiment, the data generation module 330 identifies a set of k sample HRTFs, and assigns each HRTF in the corpus 320 to one of the k samples to generate the training data 322. In such an embodiment, a HRTF can be compressed into a single label indicating the corresponding sample HRTF.

FIG. 4 illustrates an example structure of training data 322A generated by the data generation module, in accordance with an embodiment. As shown in FIG. 4, the example training data 322 includes information for 5 test subjects. The set of identified anatomical features is indicated in Columns 2 through 5, and includes the head diameter, shoulder width, height, and pinnae size of each test subject. The low-dimensional representation of the HRTF for each test subject is indicated in Columns 6 through 8, and includes a set of three parameters, in which two are spherical harmonic coefficients $C_{00}$ and $C_{10}$ for the left ear (coefficients for the right ear are omitted for simplicity), and the other is the interaural time delay (ITD) of low-frequency sounds for the test subject. Alternatively, the low-dimensional representation of the HRTF may be a variable indicating one among k sample HRTFs.

Referring back to FIG. 3, the training module 334 generates one or more machine-learned models 324 from the training data 322 that mathematically characterize the relationship between the set of anatomical features and low-dimensional HRTF representations. Specifically, given values for a set of anatomical features, the trained machine-learned models 324 output a low-dimensional HRTF representation for the set of features based on the learned correlation from the training data 322. In one embodiment, the machine-learned models 324 are decision-tree based models, such as gradient-boosted trees, random forests, and the like. In another instance, the machine-learned models are neural-network based models such as artificial neural networks (ANN), convolutional neural networks (CNN), deep neural networks (DNN), and the like. In yet another instance, the machine-learned models are linear additive models such as linear regression models, logistic regression models, support vector machine (SVM) models, and the like.

The HRTF generation module 338 receives anatomical features identified for users of the VR system 100 and generates personalized HRTF for the users based on the received features. Initially, the HRTF generation module 338 applies the machine-learned models 324 to a set of anatomical features for a user to generate the corresponding low-dimensional HRTF representation for the user. Subsequently, the HRTF generation module 338 reconstructs the full personalized HRTF from the low-dimensional HRTF representation. The personalized HRTF is provided to the VR engine 155 in the VR system 100, such that sounds can be simulated and output to the user.

For example, the HRTF generation module 338 may apply the machine-learned models 324 to a set of anatomical features to generate a set of spherical harmonic coefficients and an ITD value based on the anatomical features. The HRTF generation module 338 may then reconstruct the personalized HRTF by superposing the spherical harmonic coefficients with the corresponding spherical harmonic basis functions, and applying the phase difference indicated in the ITD value. As another example, the HRTF generation module 338 may apply the machine-learned models 324 to a set of anatomical features to generate an estimate label indicating one among k sample HRTFs. The sample HRTF corresponding to the label would then be selected as the personalized HRTF.

The HRTF generation module 338 also receives user account information for each user associated with the anatomical features such that personalized HRTFs can be stored in association with the corresponding user. The user account information may include, for example, the ID of the user in the VR system 100, account number associated with the user ID, name of the user, and the like. The HRTF generation module 338 stores each personalized HRTF in association with the corresponding user account information as HRTF store 326, such that personalized HRTF for users can be provided to the VR engine 155 when needed.

Although the following embodiments are described primarily using the embodiment of the VR system 100 shown in FIG. 2 and the embodiment of the server 120 shown in FIG. 3, certain modules and functions can be incorporated into other modules of the server 120 and/or other entities on the VR system 100. For example, all or subset of functions of the server 120 may be incorporated into the VR console 110. As another example, the server 120 may provide low-dimensional representations of the HRTF to the VR console 110 such that the personalized HRTF is reconstructed in the VR console 110. As yet another example, the VR console 110 may provide images of the users to the server 120 such that the set of anatomical features are identified form the images in the server 120.

Example Process of Applying Personalized HRTF

Figure 5:
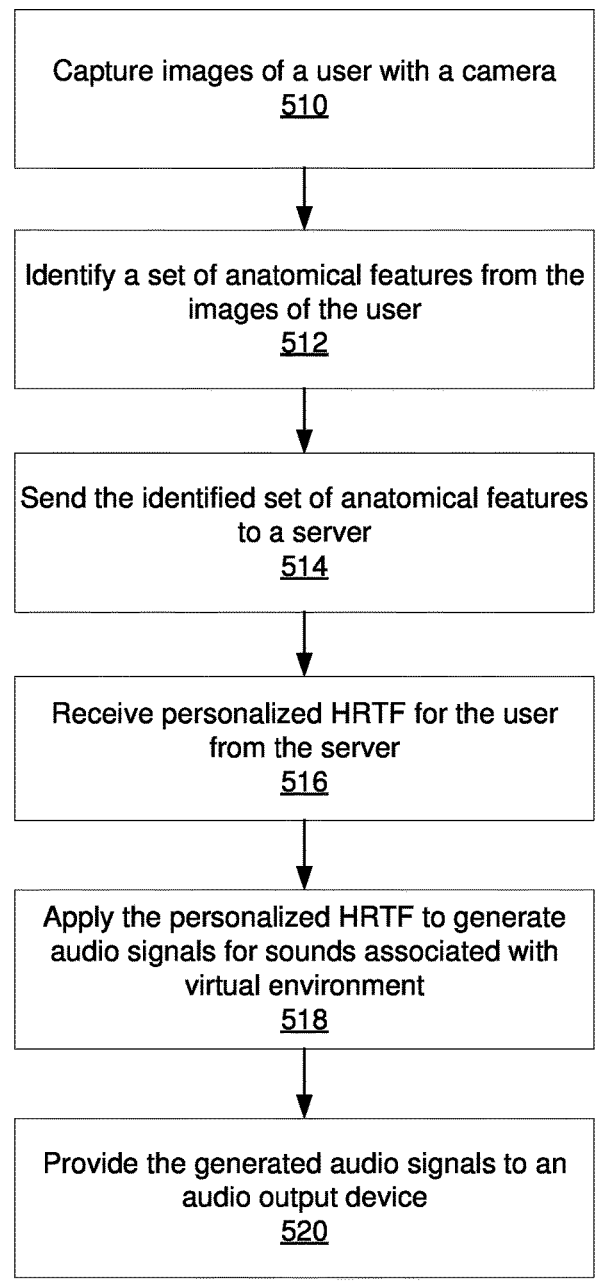
FIG. 5 is a flowchart illustrating a process of a VR system applying a personalized HRTF to generate sounds associated with a virtual environment, in accordance with an embodiment.

FIG. 5 is a flowchart illustrating a process of a VR system applying personalized HRTF to generate sounds associated with a virtual environment.

The VR system captures 510 one or more images of the user with a camera. The VR system identifies 512 a set of anatomical features from images of the user. The set of anatomical features are physical characteristics that describe the body of the user, and may include head diameter, shoulder width, and shape and size of pinnae of the user.

The set of anatomical features are sent 514 to a server, for example, via the Internet. The server may be operated by the business entity producing the VR system, or may be a separate entity from the business entity. In response to receiving the anatomical features, the server determines a personalized HRTF corresponding to the user, and sends the HRTF to the VR system, for example, via the Internet.

The VR system receives 516 the personalized HRTF for the user from the server. The VR system then applies 518 the personalized HRTF to generate audio signals for sounds associated with a virtual environment.

The generated audio signals are provided 520 to an audio output device for outputting the sounds associated with the virtual environment to the user. The audio output device generates sounds responsive to receiving the audio signals.

The process as illustrated in FIG. 5 is merely illustrative. Various changes may be made to the process of FIG. 5. For example, the VR system may generate low-dimensional HRTF based on the anatomical features, and send the low-dimensional HRTF to the server. The server may return a personalized HRTF in response to receiving the low-dimensional HRTF.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method comprising:
    obtaining, by a computing device, a set of anatomical features describing physical characteristics of a user's body relevant to a personalized head-related transfer function (HRTF) of the user, the set of anatomical features identified from one or more images of the user;
    constructing, by the computing device, the personalized HRTF of the user from the set of anatomical features of the user; and providing, by the computing device, the personalized HRTF for generating audio signals using the personalized HRTF.

2. The method of claim 1, wherein the personalized HRTF is represented by a set of parameters, and constructing the personalized HRTF of the user comprises applying a machine-learned model to the set of anatomical features of the user to generate the set of parameters for the personalized HRTF.

3. The method of claim 2, wherein the machine-learned model is trained using training data for a plurality of subjects, the training data comprising:
for each of the subjects, a training set of anatomical features obtained from one or more images of the subject, and
for each of the subjects, a training set of parameters that represent a HRTF for the subject.

4. The method of claim 1, wherein providing the personalized HRTF comprises providing the personalized HRTF to a system that generates the audio signals by applying a sound source signal to the personalized HRTF to generate the audio signals.

5. The method of claim 4, wherein the system generates the audio signals while the user interacts with a virtual reality (VR) environment, an augmented reality (AR) environment, or a mixed reality (MR) environment.

6. The method of claim 1, wherein the one or more images are RGB images from a RGB camera.

7. The method of claim 1, wherein the one or more images are depth images from a depth sensor.

8. The method of claim 1, wherein the personalized HRTF is provided to a system that applies the personalized HRTF to generate the audio signals, and wherein the computing device is included in a remote server distinct from the system.

9. The method of claim 1, wherein the computing device is included in a system for simulating a virtual reality (VR) environment, an augmented reality (AR) environment, or a mixed reality (MR) environment the user interacts with.

10. A non-transitory computer-readable medium storing instructions for execution on a processor, the instructions when executed by the processor causing the processor to perform steps comprising:
obtaining a set of anatomical features describing physical characteristics of a user's body relevant to a personalized head-related transfer function (HRTF) of the user, the set of anatomical features identified from one or more images of the user;
constructing the personalized HRTF of the user from the set of anatomical features of the user; and
providing the personalized HRTF for generating audio signals using the personalized HRTF.

11. The non-transitory computer-readable medium of claim 10, wherein the personalized HRTF is represented by a set of parameters, and constructing the personalized HRTF of the user comprises applying a machine-learned model to the set of anatomical features of the user to generate the set of parameters for the personalized HRTF.

12. The non-transitory computer-readable medium of claim 11, wherein the machine-learned model is trained using training data for a plurality of subjects, the training data comprising:
for each of the subjects, a training set of anatomical features obtained from one or more images of the subject, and
for each of the subjects, a training set of parameters that represent a HRTF for the subject.

13. The non-transitory computer-readable medium of claim 10, wherein providing the personalized HRTF comprises providing the personalized HRTF to a system that generates the audio signals by applying a sound source signal to the personalized HRTF.

14. The non-transitory computer-readable medium of claim 13, wherein the system generates the audio signals while the user interacts with a virtual reality (VR) environment, an augmented reality (AR) environment, or a mixed reality (MR) environment.

15. The non-transitory computer-readable medium of claim 10, wherein the one or more images are RGB images from a RGB camera.

16. The non-transitory computer-readable medium of claim 10, wherein the one or more images are depth images from a depth sensor.

17. The non-transitory computer-readable medium of claim 10, wherein the personalized HRTF is provided to a system at a remote location, and wherein the system applies the personalized HRTF to generate the audio signals.

18. A system comprising:
an interface module configured to receive a set of anatomical features describing physical characteristics of a user's body relevant to a personalized head-related transfer function (HRTF) of the user and identified from images of the user; and
a HRTF generation module configured to construct the personalized HRTF for the user based on the received set of anatomical features by applying a machine-learned model to the set of anatomical features for the user, and configured to provide the personalized HRTF to a device that applies the personalized HRTF to generate audio signals.

19. The system of claim 18, wherein the personalized HRTF is represented by a set of parameters, and wherein the HRTF generation module is further configured to apply a machine-learned model to the set of anatomical features of the user to construct the personalized HRTF.

20. The system of claim 18, wherein the system includes the device, and the device is configured to simulate a virtual reality (VR) environment, an augmented reality (AR) environment, or a mixed reality (MR) environment the user interacts with.

* * * * *